United States Patent [19]
Kakiuchi

[11] Patent Number: 5,373,344
[45] Date of Patent: Dec. 13, 1994

[54] RANGEFINDER

[75] Inventor: Shinichi Kakiuchi, Tokyo, Japan

[73] Assignee: Asahi Kogaku Kogyo Kabushiki Kaisha, Tokyo, Japan

[21] Appl. No.: 75,418

[22] Filed: Jun. 14, 1993

[30] Foreign Application Priority Data

Jun. 15, 1992 [JP] Japan .................................. 4-180372

[51] Int. Cl.⁵ ........................ G03B 13/36; G01C 3/08
[52] U.S. Cl. ........................................ 354/403; 356/1
[58] Field of Search ...................... 354/403; 356/1, 4; 250/201.4, 201.6

[56] References Cited

U.S. PATENT DOCUMENTS

| | | |
|---|---|---|
| 4,485,303 | 11/1984 | Suzuki . |
| 4,534,636 | 8/1985 | Sugawara ............................. 354/403 |
| 4,636,068 | 1/1987 | Niiho et al. ............................... 356/5 |
| 4,833,497 | 5/1989 | Sugawara ............................. 354/403 |
| 4,963,913 | 10/1990 | Shindo et al. ......................... 354/406 |
| 4,983,033 | 1/1991 | Suzuki ..................................... 356/4 |
| 4,999,661 | 3/1991 | Ueno et al. ........................... 354/402 |
| 5,001,508 | 3/1991 | Ogawa ................................... 354/403 |
| 5,051,767 | 9/1991 | Honma et al. ......................... 354/406 |
| 5,096,289 | 3/1992 | Mogamiya et al. ....................... 356/1 |
| 5,137,350 | 8/1992 | Misawa et al. ........................... 356/1 |
| 5,184,167 | 2/1993 | Iida et al. ............................. 354/403 |

*Primary Examiner*—Perkey W. B.
*Attorney, Agent, or Firm*—Sandler, Greenblum & Bernstein

[57] ABSTRACT

A rangefinder for detecting a distance of an object from the rangefinder by employing a triangular measuring system has a radiation emitter to emit infrared radiation towards the object; a position detector having a close-range detecting region and a remote-range detecting region, which are separate and independent of each other; a close-range converging lens for focusing the radiation reflected by the object on the close-range detecting region, when the distance of the object from the rangefinder is smaller than a predetermined distance; and a remote-range converging lens for focusing the radiation reflected by the object on the remote-range detecting region, when the distance of the object from the rangefinder is greater than a predetermined distance.

20 Claims, 6 Drawing Sheets

RANGEFINDER

BACKGROUND OF THE INVENTION

The present invention relates to a rangeflnder for use in an automatic focusing mechanism in a camera. One known automatic focusing system for use in cameras is an active infrared system. According to the active infrared system, infrared radiation is applied to an object to be photographed, and the reflected infrared image of the object is focused on a position detector such as a PSD (Position Sensitive Device) for detection thereby. The distance of the object from the rangefinder is detected based on the principles of the triangular measuring system using the signal produced by the PSD.

The infrared radiation reflected by the object is focused onto the PSD by a single lens positioned in front of the PSD. The reflected infrared radiation that has passed through the lens is converged on the PSD at a position depending on the distance of the object from the rangefinder. The conventional active infrared system is arranged such that the shorter the distance of the object from the rangefinder, the closer to an end of the PSD the infrared radiation reflected by the object is converged on the PSD. The output signal generated by the PSD becomes lower as the position of the radiation approaches the nonlinear end, because the focused image on the PSD becomes more elliptical toward the nonlinear end of the PSD. Consequently, it has been difficult for the conventional active infrared system to detect the distance of an object from the rangefinder with sufficient accuracy over a wide distance range.

SUMMARY OF THE INVENTION

It is therefore an object of the present invention to provide a rangefinder of a relatively simple arrangement which is capable of detecting distances highly accurately in a wide distance range. To achieve the above object, there is provided in accordance with an aspect of the present invention a rangefinder for measuring a distance of an object from said rangefinder by employing a triangular measuring system, comprising
   means for emitting radiation to an object;
   means for detecting a position of an incident radiation beam; and
   means for converging radiation reflected by said object onto the position detecting means,
   wherein the converging means includes:
   a close-range converging means for converging radiation reflected from the object; and
   a remote-range converging means for converging radiation reflected from the object,
   and the position detecting means includes:
   a close-range portion where radiation converged by said close-range converging means, is incident; and
   a remote-range portion where radiation converged by the remote-range converging means is incident, the close-range and remote-range portions are separate and independent of each other.

DESCRIPTION OF THE EMBODIMENTS

Figure 1:
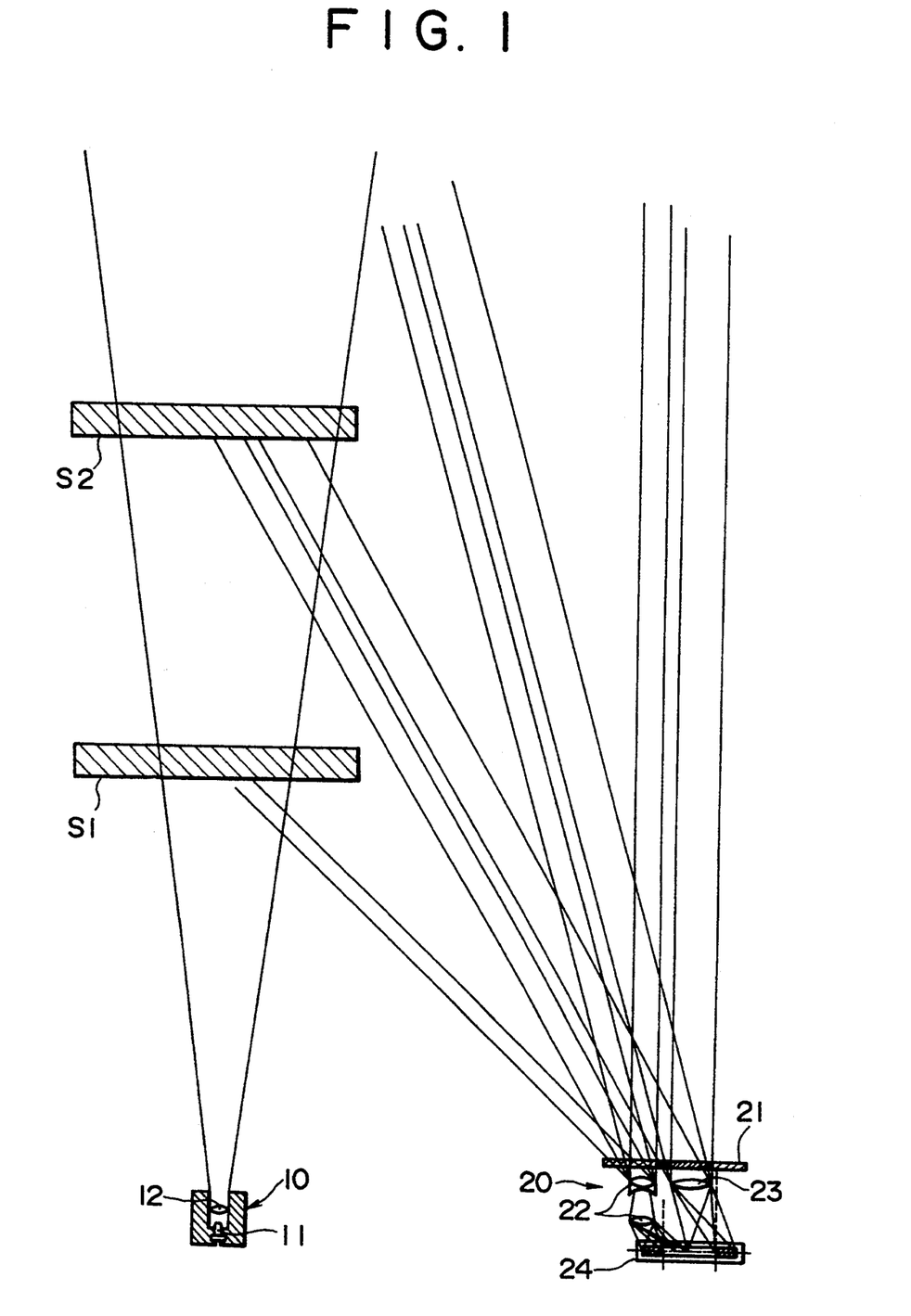
FIG. 1 is a cross-sectional view of a rangefinder according to a first embodiment of the present invention.

As shown in FIG. 1, a rangefinder according to a first embodiment of the present invention generally comprises radiation unit 10 and a rangefinder unit 20 that are, totaled for example, in a camera housing (not shown), positioned in a laterally spaced relationship to each other. The radiation unit 10 includes an LED (light-emitting diode) 11 for emitting infrared radiation and a lens 12 for refracting the emitted infrared radiation as a substantially parallel infrared radiation beam. The infrared radiation beam radiated from the radiation unit 10, is applied to and reflected by an object S1 or S2, and the reflected infrared radiation, representative of the object image, is applied to the rangefinder unit 20. The object S1 represents an object position which is relatively close to the rangefinder, while the object S2 represents an object position which is further away from the rangefinder than the position represented by object S1.

The rangefinder unit 20 has a light-shielding filter 21 and a position detector 24, such as a PSD, positioned below the light-shielding filter 21 (as shown in FIG. 1). The light-shielding filter 21 serves to guide the reflected infrared radiation toward a close-range converging lens 22, and a remote-range converging lens 23; which are separated from each other and positioned between the light-shielding filter 21 and the PSD 24. The close-range converging lens 22 and the remote-range converging lens 23 converge the infrared radiation that has passed through the light-shielding filter 21 onto the PSD 24.

The rangefinder unit 20 will be described in greater detail with reference to FIG. 2.

Figure 2:
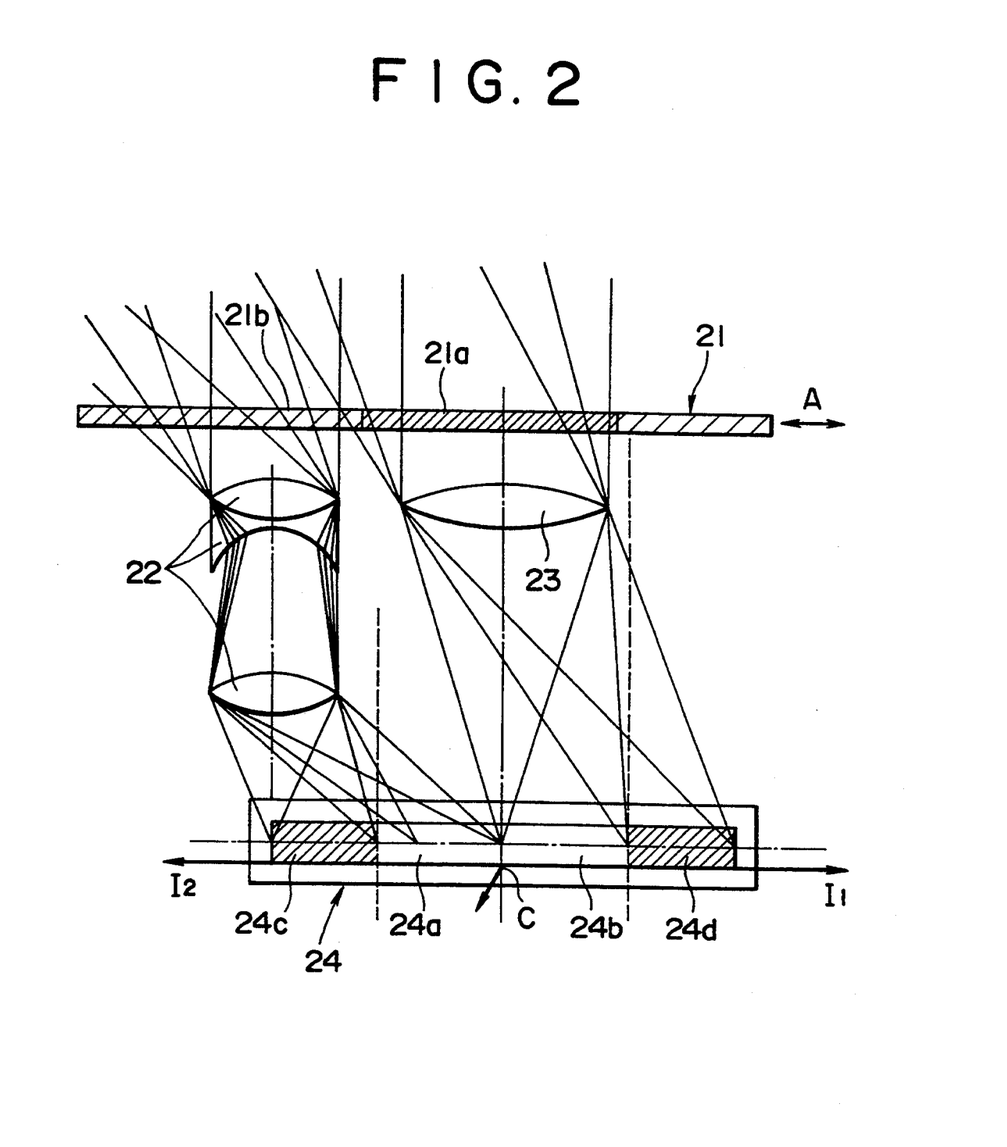
FIG. 2 is an enlarged cross-sectional view of a portion of the rangefinder shown in FIG. 1.

In FIG. 2, the infrared radiation reflected by an object is converged on the PSD at a position which is dependent on the distance of the object from the rangefinder, and the PSD 24 generates a distance signal depending on the position where the infrared radiation is converged on the PSD 24. A PSD comprises a linear portion (corresponding to 24a and 24b), and a nonlinear portion (corresponding to 24c and 24d). Thus, in this embodiment, PSD 24 comprises two PSDs which are joined at their linear-portion ends to produce a continuous linear portion that is longer than that for a single PSD. Also, this particular arrangement results in the linearlty of PSD 24 increasing from the outside ends towards the center. The PSD 24 has a close-range detecting region 24a, and a remote-range detecting region 24b, which are joined to each other. The close-range detecting reglon 24a is positioned on the lefthand side (as viewed in FIG. 2) of a center C of the PSD 24, and the remote-range detecting region 24b is positioned on the righthand side of the center C. The PSD 24 also has nonlinear output regions 24c, 24d located on the lefthand side of the close-range detecting region 24a and the righthand side of the remote-range detecting region 24b, respectively. When infrared radiation is applied to these nonlinear output regions 24c, 24d, the PSD 24 generates an output signal that is not proportional (does not correspond to a linear equation) with respect to the distance of the object from the rangefinder.

The light-shielding filter 21 includes a light-transmitting region 21a for passing at least infrared radiation, and a light-shielding region 21b for blocking light including infrared radiation. The light-shielding filter 21 is movable by an actuator 34 (shown in FIG. 3) in one direction or the other as indicated by tire arrow A depending on the distance of the object S1 or S2 from the rangefinder. More specifically, when the distance from the rangefinder of the object S2 which is positioned further away from the camera is to be measured, the light-shielding filter 21 is positioned at the right position (as viewed in FIG. 2), allowing the infrared radiation reflected by the object S2 to pass through the light-transmitting region 21a to the remote-range converging lens 23. When the distance from the rangefinder of the object S1 which is positioned closer to the camera is to be measured, the light-shielding filter 21 is positioned at the left position (as viewed in FIG. 2), allowing the infrared radiation reflected by the object S1 to pass through the light-transmitting region 21a to the close-range converging lens 22. The method that determines how the light-shielding filter 21 is positioned, is described later.

Figure 3:
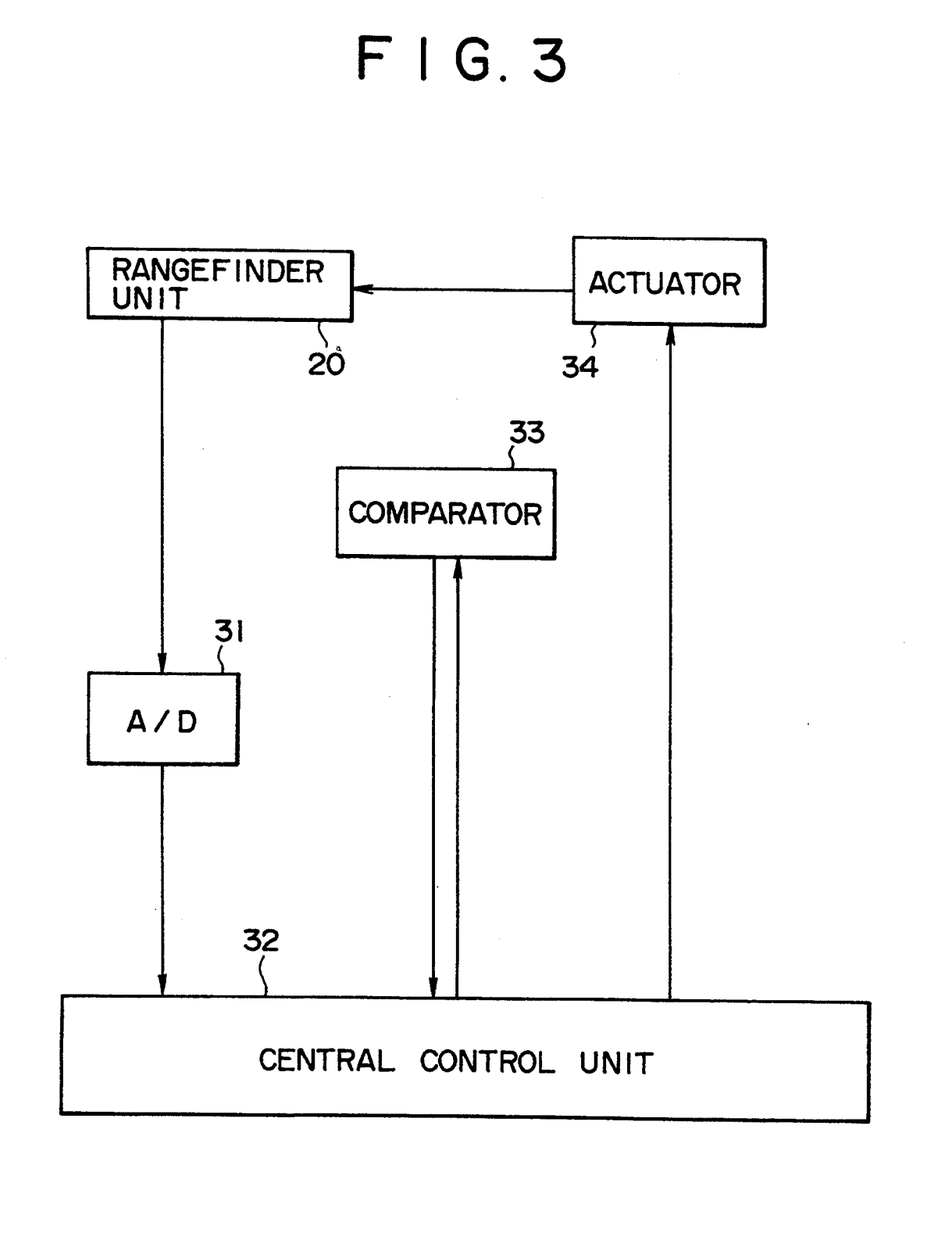
FIG. 3 is a block diagram of a circuit arrangement comprising the rangefinder shown in FIG. 1.

FIG. 3 shows a circuit arrangement for moving the light-shlelding unit 21 as indicated by the arrow A in FIG. 2.

As shown in FIG. 3, a distance signal generated by the rangefinder unit 20 (described later) is converted into a digital distance signal by an A/D converter 31, and the digital distance signal is supplied to a central control unit 32. The central control unit 32 has a microcomputer which supplies the digital distance signal to a comparator 33. The comparator 33 compares the supplied digital distance slgnal with a predetermined threshold signal, and supplies the central control unit 32 with a control signal whose level depends on whether the digital distance signal is larger or smaller than the predetermined threshold signal. The central control unit 32 responds to the control signal and controls an actuator 34 to move the light-shielding fIlter 21 to the right or left position as shown in FIG. 2.

An operation of the rangefinder and the associated circuitry will be described below with reference to FIGS. 2, 4, 5 and 6.

Figure 4:
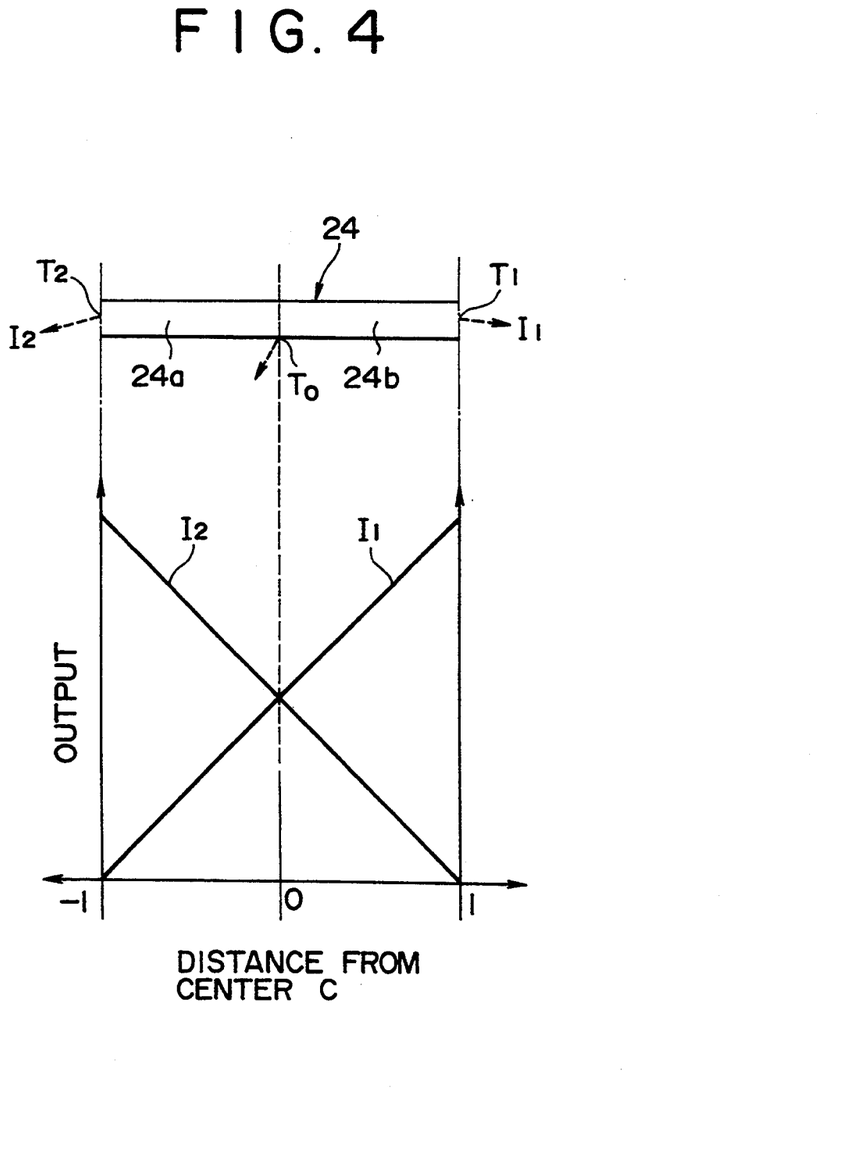
FIG. 4 is a schematic diagram showing the relationship between a PSD and its output slgnal.

FIG. 4 shows the relationship between the PSD 24 and the output signal thereof. When the PSD 24 detects infrared radiation applied thereto, its first and second terminals T1, T2 produce respective currents I1, I2 depending on the position where the infrared radiation falls on the PSD 24. The magnitude of the current I1 increases linearly as the position where the infrared radiation falls on the PSD 24 moves closer to the end of the remote-range detecting region 24b which is next to the nonlinear output region 24d. The magnitude of the current I2 increases linearly as the position where the infrared radiation falls on the PSD 24 moves closer to the end of the close-range detecting region 24a which is next to the nonlinear output region 24c. The magnitudes of the currents I1, I2 are equal to each other when the infrared radiation falls on the center C of the PSD 24.

When the current I1 flows through a resistor connected to the first terminal T1, a voltage V1 is developed across the resistor, and when the current I2 flows through a resistor connected to the second terminal T2, a voltage V2 is developed across the resistor. The rangefinder unit 20 produces a distance signal indicated by $VAF = V1/V2$. In this embodiment, the resistors which are connected respectively to the first and second terminals T1 and T2, have the same resistances. Therefore, the distance signal produced by the rangefinder unit 20 may be represented by $VAF = I1/I2$.

Figure 5:
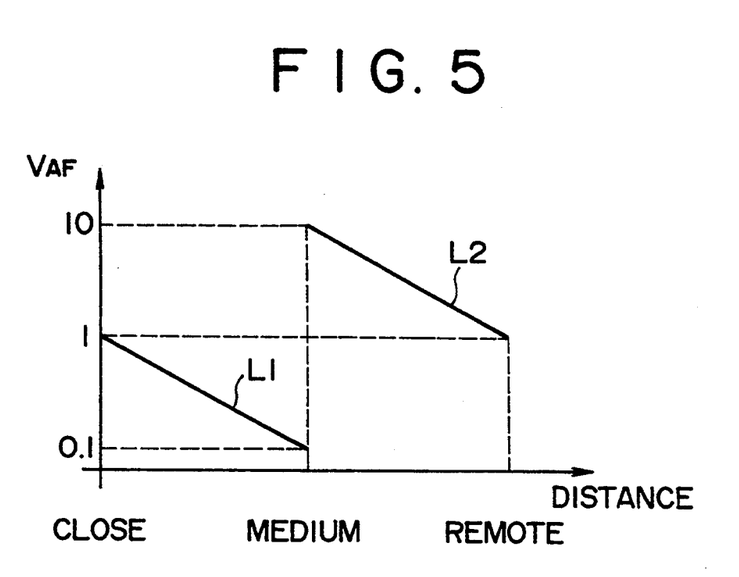
FIG. 5 is a schematic diagram showing the relationship between the output signal of a rangefinder unit and the distance of an object from the rangefinder.

When the reflected infrared radiation falls on the remote-range detecting region 24b, the distance signal VAF generated by the rangefinder unit 20 approaches "1", as indicated by the solid line L2 in FIG. 5, if the object S2 moves towards infinity, (i.e., if the reflected infrared radiation falls on the center C), andapproaches "10" if the object S2 moves to a medium distance, (i.e., if the reflected infrared radiation falls closer to the nonlinear output region 24d.

When the reflected infrared radiation falls on the close-range detecting region 24a, the distance signal VAF generated by the rangefinder unit 20 approaches "0.1", as indicated by the solid line L1 in FIG. 5, if the object S1 moves towards a medium distance (i.e., if the reflected infrared radiation falls closer to the nonlinear output region 24c), and approaches "1" if the object S1 moves to a close distance (i.e., if the reflected infrared radiation falls on the center C). The vertical axis of the graph shown in FIG. 5 represents logarithmic values.

The distance signal VAF is converted by the A/D converter 31 into a digital distance signal VAFD, which is then supplied to the central control unit 32. The central control unit 32 converts the digital distance signal VAFD, produced from the close-range detecting region 24a, to a converted digital distance signal VAFDC that represents the inverted distance signal VAF (i.e., 1/VAF), as indicated by the solid line L3 in FIG. 6. Thus, the converted digital distance signal VAFDC corresponding to the reciprocal 1/VAF of the distance signal VAF produced from the close-range detecting region 24a, is employed for switching the light-shielding filter 21 and detecting the distance of the object from the rangefinder. The vertical axis of the graph shown in FIG. 6 also represents logarithmic values.

Figure 6:
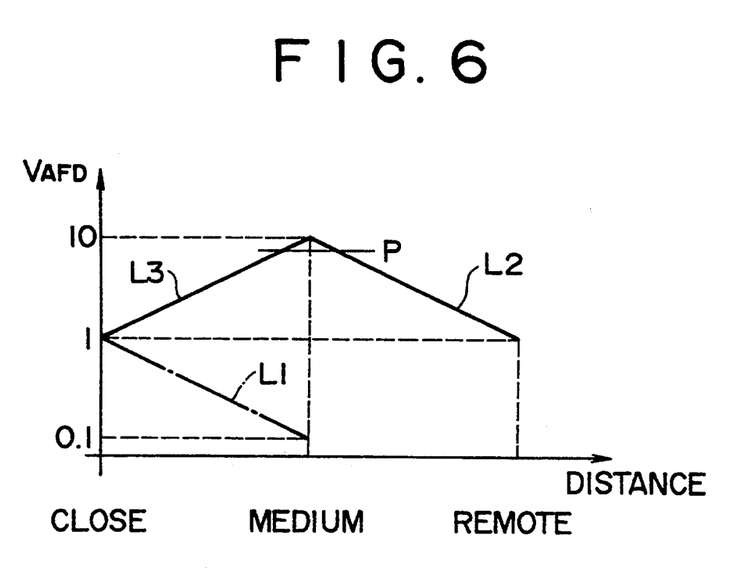
FIG. 6 is a schematic diagram showing the relationship between a distance signal and the distance of an object from the rangefinder in a central control unit.

Operation of the rangefinder to switch the light-shielding filter 21 and detect the distance of the object from the rangefinder will be described below with reference to FIGS. 2 and 6.

The distance of the object from the rangefinder when the object is at a certain position is measured as follows: initially, the light-shielding filter 21 is positioned in the remote-range setting (i.e., positioned as shown in FIG. 2). Therefore, the infrared radiation reflected by the object passes through the remote-range converging lens 23, and is converged on the remote-range detecting region 24b or the nonlinear output region 24d. If the infrared radiation reflected by the object is converged on the remote-range detecting region 24b, then the distance slgnal VAFD is produced along the solid line L2 in FIG. 6, and the distance of the object from the rangefinder is measured based on this distance signal VAFD.

If the infrared radiation reflected by the object is converged on the nonlinear output region 24d or on the remote-range detecting region 24b near the nonlinear output region 24d, the distance signal VAFD is in excess of the predetermined threshold value P. Thus, the light-shielding filter 21 is moved to the left position, whereupon the infrared radiation reflected by the object passes through the close-range converging lens 22 to the close-range detecting region 24a. The converted digital distance signal VAFDC is employed to detect the distance of the object from the rangefinder.

Measurement of the distance of an object from the rangefinder as the object moves towards the rangefinder is next described.

Initially, the light-shielding filter 21 is in the right position as described above. It is assumed that the object is at a relatively remote distance and the infrared radiation reflected by the object is converged on the remote-range detecting region 24b. When the object moves from the remote distance to the medium distance, the position where the infrared radiation falls on the PSD 24 moves away from the center C of the PSD, towards the nonlinear region 24d. The distance signal VAFD becomes progressively greater than "1" along the solid line L2 in FIG. 6. Therefore, the distance data produced follows the solid line L2.

As the distance of the object from the rangefinder becomes smaller, the position where the infrared radiation falls on the PSD 24, moves toward the nonlinear output region 24d. When the digital distance signal VAFD exceeds a threshold value P, which may be 9.5, for example, the actuator 34 is energized to move the light-shielding filter 21 to the left position in FIG. 2. Thus, the infrared radiation reflected by the object is then converged on the close-range detecting region 24a. At this time, the converted digital distance signal VAFDC (corresponding to 1/VAF), as indicated by the solid line L3 in FIG. 6, is employed. Upon further reduction in the distance of the object from the rangefinder, the position where the infrared radiation falls on the PSD 24 moves away from the nonlinear output region 24c towards the center of the PSD, and the converted digital distance signal VAFDC becomes smaller than the predetermined threshold value, and approaches 1, moving along the solid line L3.

Measurement of the distance of an object from the rangefinder as the object moves away from the rangefinder is now described.

After the initial measurement processing described above, the light-shielding filter 21 is in the left position in FIG. 2, allowing the reflected infrared radiation to fall on the close-range detecting region 24a. Therefore, the converted digital distance signal VAFDC is employed. As the object moves from the close distance to the medium distance, the position where the infrared radiation falls on the PSD 24 moves away from the center C, and the converted digital distance signal VAFDC becomes larger than "1", moving along the solid line L3. Thus, distance data is obtained according to the solid line L3.

As the distance of the object from the rangefinder becomes larger, the position where the infrared radiation falls on the PSD 24 moves closer to the nonlinear output region 24c. When the converted digital distance signal VAFD exceeds a threshold value P, which may be 9.5, for example, the actuator 34 is energized to move the light-shielding filter 21 to the right position in FIG. 2.

Now, the infrared radiation reflected by the object is converged on the remote-range detecting region 24b. At this time, the distance signal VAFD, as indicated by the solid line L2 in FIG. 6, is employed. Upon further increase in the distance of the object from the rangefinder, the position where the infrared radiation falls on the PSD 24 moves away from the nonlinear output region 24d and towards the center of the PSD. The distance signal VAFD becomes smaller than the predetermined threshold value, and approaches 1, moving along the solid line L2.

As described above, when the distance of the object from the rangefinder is relatively large, the infrared radiation reflected by the object is converged on the remote-range detecting region 24b of the PSD 24. The greater the distance of the object from the rangefinder, the closer the infrared radiation is converged to the center C of the PSD 24, (i.e., to the region where the output signal of the PSD 24 is most linear). Therefore, the distance data produced by the rangefinder unit 20 is highly accurate and reliable.

When the distance of the object from the rangefinder is relatively small, the infrared radiation reflected by the object is converged on the close-range detecting region 24a of the PSD 24. The smaller the distance of the object from the rangefinder, the closer the infrared radiation is converged to the center C of the PSD 24, (i.e., to the region where the output signal of the PSD 24 is most linear). Therefore, the distance data produced by the rangefinder unit 20 is also highly accurate and reliable. Consequently, the rangefinder unit 20, which is composed of the light-shielding filter 21, the close-range converging lens 22, and the remote-range converging lens 23, is capable of producing accurate distance data particularly in remote-range and close-range settings. The rangefinder according to this embodiment is of a relatively simple arrangement, and can measure distances highly accurately in a wide range from close to remote distances.

Figure 7:
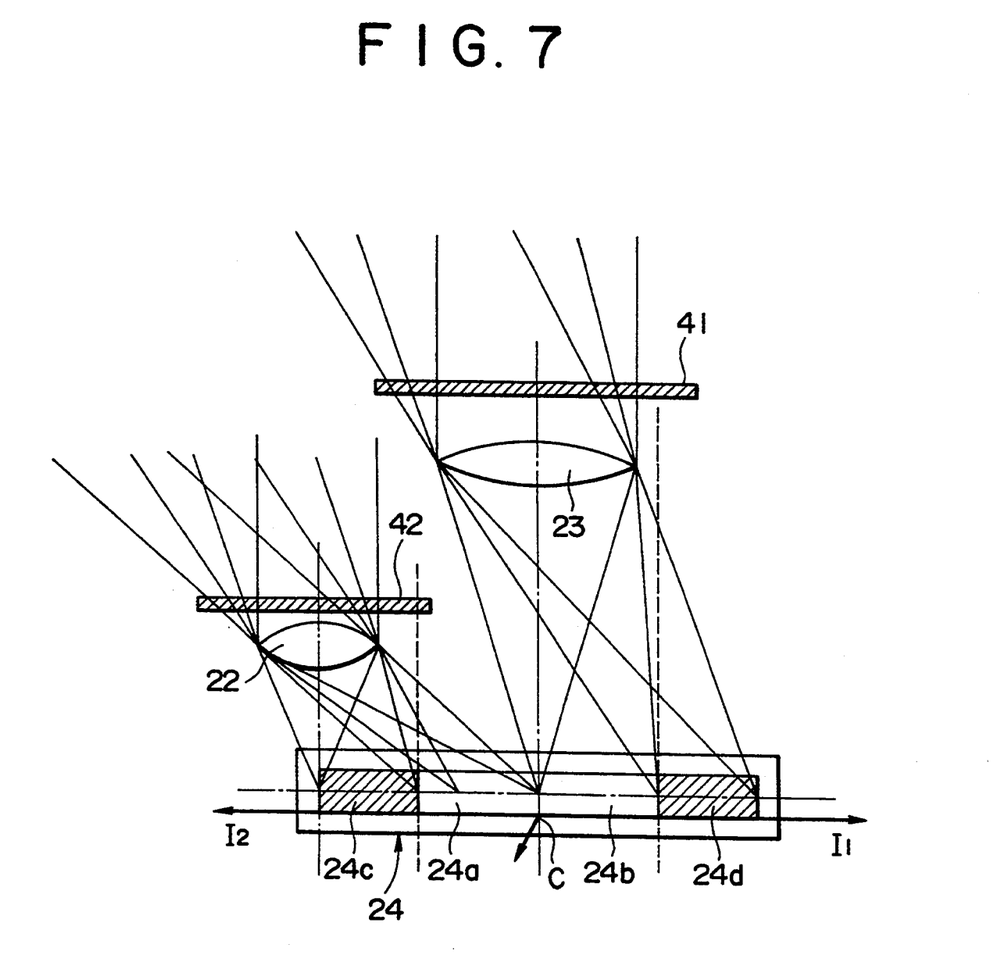
FIG. 7 is an enlarged cross-sectional vlew of a portion of a rangefinder according to a second embodiment of the present invention.

FIG. 7 shows a rangefinder according to a second embodiment of the present invention. The rangefinder shown in FIG. 7 has close-range and remote-range converging lenses 22, 23, and a PSD 24 which are similar to those shown in FIG. 2. It also includes a pair of light-shielding filters 41, 42 associated respectively with the close-range and remote-range converging lenses 22, 23. The light-shielding filters 41, 42 are independently movable with respect to the close-range and remote-range converging lenses 22, 23. Each of the light-shielding filters 41, 42 comprises a light-shielding region for blocking infrared radiation. When the close-range converging lens 22 is to be used for converging the infrared radiation reflected by the object, the light-shielding filter 42 moves away from a position in front of the close-range converging lens 22, and the light-shielding filter 41 moves into a position in front of the remote-range converging lens 23. Therefore, the close-range converging lens 22 is opened and the remote-range converging lens 23 is closed. When the remote-range converging lens 23 is to be used for converging the infrared radiation reflected by the object, the light-shielding filter 41 moves away from a position in front of the remote-range converging lens 23, and the light-shielding filter 42 moves into a position in front of the close-range converging lens 22. Therefore, the remote-range converging lens 23 is opened and the close-range converging lens 22 is closed.

The other details of the rangefinder shown in FIG. 7 are the same as those of the rangefinder shown in FIG. 2. The rangefinder shown in FIG. 7 operates essentially in the same manner as the rangefinder shown in FIG. 2. While infrared radiation is used to detect the distance of an object from the rangefinder in each of the above embodiments, the principles of the present invention are also applicable to a rangefinder in which visible light is used to detect the object distance.

In the present invention the two PSDs that form PSD 24 are positioned such that their linear portions are adjacent to each other. However other configurations of the lenses 22 and 23 can be such that the PSDs are not adjacent to each other, but the overall rangefinder distance measuring technique described herein Is nonetheless employed.

A camera employing a rangefinder was mentioned as an example of an application incorporating this invention. However the invention is not limited to this application but can be employed wherever a rangefinder is used for measuring distances of objects.

The present disclosure relates to a subject matter contained in Japanese Patent Application No. HEI 4-180372, filed on Jun. 15, 1992, which is expressly incorporated herein by reference in is entirety.

What is claimed is:

1. A rangefinder for measuring a distance of an object from said rangefinder by employing a triangular measuring system, comprising:
   means for emitting radiation to an object;
   means for detecting a position of an incident radiation beam; and
   means for converging radiation reflected by said object onto said position detecting means,
   wherein said converging means comprises:
   close-range means for converging radiation reflected from said object; and
   remote-range means for converging radiation reflected from said object,
   and wherein said position detecting means comprises:
   a close-range portion where radiation converged by said close-range converging means, is incident; and
   a remote-range portion where radiation converged by said remote-range converging means, is incident, said close-range and remote-range portions being separate and independent of each other, wherein said close-range portion and said remote-range portion of said position detecting means each comprise a linear sensing area and a nonlinear sensing area, said linear sensing areas positioned adjacent to each other to form a junction.

2. The rangefinder according to claim 1 which further comprises means for selectively passing radiation reflected from said object to said close-range converging means while blocking said radiation from passing to said remote-range converging means, and selectively passing said radiation to said remote-range converging means while blocking said radiation from passing to said close-range converging means.

3. The rangefinder according to claim 1, wherein said close-range converging means is positioned such that as said distance of said object from said rangefinder becomes smaller, the position of said radiation converged by said close-range converging means moves towards said junction of said linear portions of said position detecting means, and said remote-range converging means is positioned such that as said distance of said object becomes greater, said position of said radiation converged by said remote-range converging means moves towards said junction of said linear portions of said position detecting means.

4. The rangefinder according to claim 1 wherein said position detecting means uses only said linear sensing area for measuring the position of said object.

5. The rangefinder according to claim 4 wherein said position detecting means uses said nonlinear sensing areas to determine the position of said means for selectively passing radiation.

6. The rangefinder according to claim 1, wherein said select means comprises a movable light-shielding filter having a light shielding portion and a light transmitting portion.

7. A rangefinder for measuring a distance of an object from said rangefinder, comprising:
   radiating means for emitting to an object;
   means for detecting radiation selectively in a close-range detecting region and a remote-range detecting region, said close-range and remote-range detecting regions being separate and independent of each other; and
   means for converging radiation reflected by the object selectively on the close-range detecting region and the remote-range detecting region.

8. The rangefinder according to claim 7, wherein said converging means comprises means for converging the radiation reflected by the object on said close-range detecting region with greater output linearity when the object is positioned at a distance from the rangefinder that is smaller than a predetermined distance, and means for converging the radiation reflected by the object on said remote-range detecting region with greater output linearity when the object is positioned at a distance that is greater than said predetermined distance.

9. The rangefinder according to claim 7, wherein said converging means comprises close-range converging means for converging the radiation reflected by the object on said close-range detecting region, and remote-range converging means for converging the radiation reflected by the object on said remote-range detecting region.

10. The rangefinder according to claim 9, further comprising means for selectively passing the radiation reflected by the object toward one of said close-range converging lens and said remote-range converging lens.

11. The rangefinder according to claim 10, wherein said select means comprises a movable light-shielding filter having a light shielding portion and a light transmitting portion.

12. A rangefinder for detecting a distance from an object to said rangefinder by employing a triangular measuring system, comprising:
    a detector having a close-range detecting region with greater output linearity toward one end thereof and a remote-range detecting region with greater output linearity toward one end thereof, said close-range and remote-range detecting regions being separate and independent of each other;
    means for emitting radiation to an object; and
    an optical lens system for focusing radiation reflected by the object selectively on said close-range detecting region more closely to said one end thereof when said distance of said object from said rangefinder is smaller than a predetermined distance, and on said remote-range detecting region more closely to said one end thereof when said distance of said object from said rangefinder is greater than said predetermined distance.

13. The rangefinder according to claim 12, wherein said optical lens system comprises a close-range converging lens for converging the radiation reflected by the object on said close-range detecting region, and a remote-range converging lens for converging the radiation reflected by the object on said remote-range detecting region.

14. The rangefinder according to claim 13, further comprising means for selectively passing the radiation reflected by the object toward one of said close-range converging lens and said remote-range converging lens.

15. The rangefinder according to claim 14, wherein said select means comprises a movable light-shielding filter and an actuator for moving said light shielding filter toward one of said close-range converging lens and said remote range converging lens.

16. A rangefinder for detecting a distance of an object from said rangefinder, comprising:
 means for applying radiation to an object;
 means for detecting radiation reflected by said object, said radiation detector having a close-range detecting region and a remote-range detecting region, said close-range and remote-range detecting regions being separate and independent of each other, joined to each other at a center of the radiation detector, said close-range detecting region having greater output linearlty toward said center and said remote-range detecting region having greater output linearity toward said center; and
 an optical lens system for focusing radiation reflected by said object selectively on said close-range detecting region more closely to said center when said distance of said object from said rangefinder is smaller than a predetermined distance, and on said remote-range detecting region more closely to said center when said distance of said object from said rangefinder is greater than said predetermined distance.

17. The rangefinder according to claim 16, wherein said optical lens system comprises a close-range converging lens for converging the radiation reflected by the object on said close-range detecting region, and a remote-range converging lens for converging the radiation reflected by the object on said remote-range detecting region.

18. The rangefinder according to claim 17, further comprising means for selectively passing the radiation reflected by the object toward one of said close-range converging lens and said remote-range converging lens.

19. The rangefinder according to claim 18, wherein said select means comprises a movable light-shielding filter having a light shielding portion and a light transmitting portion.

20. The rangefinder according to claim 19, wherein said movable light-shielding filter comprises a light shielding portion and a light transmitting portion.

* * * * *

UNITED STATES PATENT AND TRADEMARK OFFICE
CERTIFICATE OF CORRECTION

PATENT NO. : 5,373,344
DATED : December 13, 1994
INVENTOR(S) : Shinichi KAKIUCHI It is certified that error appears in the above-indentified patent and that said Letters Patent is hereby corrected as shown below:

At column 7, line 56 (claim 3, line 1), change "clalm 1" to ---claim 1---.

At column 8, line 8 (claim 6, line 1), change "claim 1" to ---claim 2---.

At column 8, line 14 (claim 7, line 3), delete "radiating".

At column 9, line 26 (claim 16, line 11), change "linearlty" to ---linearity---.

Signed and Sealed this

Eighteenth Day of July, 1995

Attest:

BRUCE LEHMAN

Attesting Officer          Commissioner of Patents and Trademarks